(12) United States Patent
Carter

(10) Patent No.: US 8,020,339 B1
(45) Date of Patent: Sep. 20, 2011

(54) FISHING LURE RELEASE SYSTEM

(76) Inventor: Russell R. Carter, Akron, OH (US)

( * ) Notice: Subject to any disclaimer, the term of this patent is extended or adjusted under 35 U.S.C. 154(b) by 542 days.

(21) Appl. No.: 12/173,996

(22) Filed: Jul. 16, 2008

(51) Int. Cl.
*A01K 85/00* (2006.01)

(52) U.S. Cl. ............ 43/42.08; 43/42.36; 43/44.83; 24/594.1

(58) Field of Classification Search .......... 24/594.1; 43/42.08, 42.36, 44.83
See application file for complete search history.

(56) References Cited

U.S. PATENT DOCUMENTS

| | | | | |
|---|---|---|---|---|
| 724,362 | A | * | 3/1903 | Wilson ............ 24/600.4 |
| 801,649 | A | * | 10/1905 | Coffin ............ 43/42.51 |
| 1,114,289 | A | * | 10/1914 | Rittenhouse ............ 59/85 |
| 1,713,041 | A | * | 5/1929 | Fey ............ 43/44.86 |
| 1,719,662 | A | * | 7/1929 | Jones ............ 24/600.4 |
| 1,779,343 | A | * | 10/1930 | Sylvanne ............ 24/600.4 |
| 2,960,789 | A | * | 11/1960 | Paynter ............ 43/42.08 |
| 3,004,319 | A | * | 10/1961 | Hennon ............ 24/598.5 |
| 4,920,688 | A | | 5/1990 | Devereaux et al. |
| 4,947,574 | A | | 8/1990 | Tapley |
| 5,090,151 | A | | 2/1992 | Salminen |
| 5,630,289 | A | | 5/1997 | Dotson |
| D405,866 | S | | 2/1999 | Laney |
| 5,899,015 | A | | 5/1999 | Link |
| 5,953,849 | A | * | 9/1999 | Boucher, Jr. ............ 43/42.24 |
| 6,082,039 | A | | 7/2000 | McGuiness |
| 6,941,695 | B2 | | 9/2005 | Minegar |
| 7,076,911 | B2 | | 7/2006 | Thorne |

* cited by examiner

*Primary Examiner* — Christopher P Ellis
(74) *Attorney, Agent, or Firm* — John D. Gugliotta, PE, Esq

(57) ABSTRACT

A fishing lure release apparatus is a quick release system that allows rapid interchanging of fishing lures on a fishing. An closed wire loop eyelet opposite a posterior open end clasp are opposed along a linearly elongated wire form. The posterior open end clasp forms an attachable hook element that is impinged by a spring urged closure. The hook element is inserted into a inner tubular cavity of the closure causing an impingement of the hook opening for securely holding and maintaining a mechanical coupling to anything attached thereto, while at the same time providing easy removal by sliding the closure upward along the body of the wire form.

8 Claims, 3 Drawing Sheets

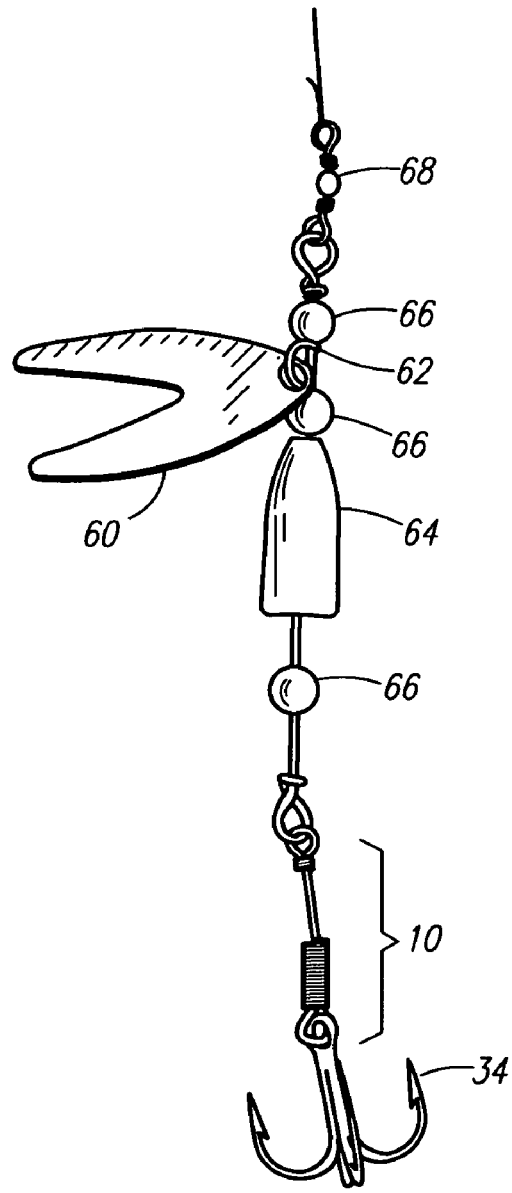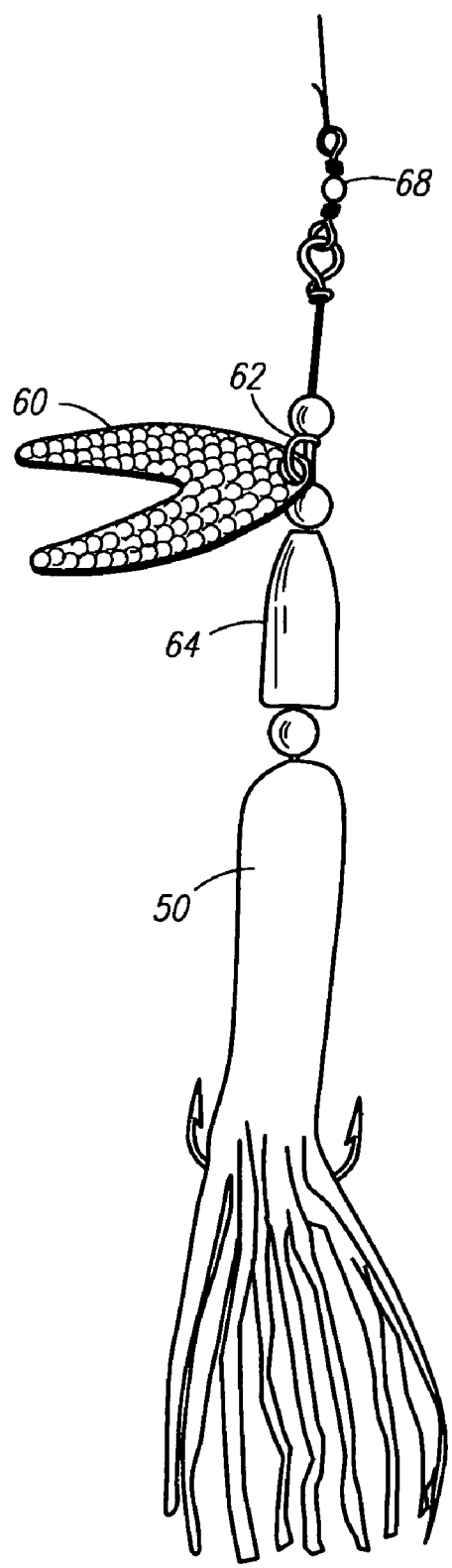
Fig. 5a
Fig. 5b

FISHING LURE RELEASE SYSTEM

RELATED APPLICATIONS

There are no previously filed, nor currently any co-pending applications, anywhere in the world.

BACKGROUND OF THE INVENTION

1. Field of the Invention

The present invention relates to fishing lures, and more particularly to hook attaching/releasing elements within fishing lure kits and assemblies.

2. Description of the Related Art

In America, fishing has grown beyond that of a hobby or leisure activity and has become a competitive professional sport. Competitions with large purses are held all over America. There is a lot of pressure on the competitors, the fishermen, to catch ever-increasing amounts of fish. As a result, fishing lures are expected to perform at a higher level as well.

As a result, the technology used by anglers to catch fish has become increasingly complex in nature. Fishermen no longer rely on the traditional hook and worm approach to attract their targets. Instead, a broad range of products have hit the market, designed to aid the fisherman to catch more fish quickly. One of the most common and popular fishing accessories is the fishing lure, as evidenced by the multitude of different types and styles available on the market. However, such a selection is a drawback when it comes to the amount of time that must be spent changing lures on and off of a fishing line all day. No matter how good the lure, it will not catch any fish out of the water.

Accordingly, there is a need for a means by which fishing lures can be rapidly changed on and off of a fishing line while fishing.

A search of the prior art did not disclose any patents that read directly on the claims of the instant invention; however, the following references were considered related:

U.S. Pat. No. 6,941,695, issued in the name of Minegar, discloses a fishing lure assembly that incorporates multiple retractable hooks. A series of latches and positioners cause movement of the hooks upon application of pressure.

U.S. Pat. Ser. No. Des. 405,866, issued in the name of Laney, discloses an ornamental design for a diving fishing weight. While a design patent protects only the ornamental appearance of an article, and not its structure or utilitarian features, this references discloses environmental structures that insinuate the use of modular elements.

U.S. Pat. No. 6,082,039, issued in the name of McGuiness, discloses a fishing lure with articulatable hook connections. In this reference, the hook connector, noted as element 24, is formed of a flexible, braided filament.

U.S. Pat. No. 4,920,688, issued in the name of Devereaux et al., discloses a swivel jig fishing lure. As particularly indicated in FIG. 3 of this reference, a neck portion mounted between the hook and line spans approximately % of the distance along the length of the plastic worm. The only particular purpose stated within the patent is to provide "trouble free service life".

U.S. Pat. No. 5,630,289, issued in the name of Dotson, discloses a fishing lure kit in which a flexible main body (element 22) is used.

U.S. Pat. No. 5,899,015, issued in the name of Link, discloses a fishing jig with recessed, and attachable/removable skirt.

U.S. Pat. No. 5,090,151, issued in the name of Salminen, discloses a fishing lure with releasable hook. However, in this device the hook and body are designed to separate when striking, occurs.

U.S. Pat. No. 7,076,911, issued in the mane of Thorne, discloses a soft body covered swimming jig fishing lure. In particular, FIGS. 4 and 5 show anticipated attachment with a spinner.

U.S. Pat. No. 4,947,574, issued in the name of Tapley, discloses a spring loaded fishing hook assembly.

Consequently, there is always an need for new and innovative fishing lures and attachments.

SUMMARY OF THE INVENTION

Therefore, it is an object of the invention to provide an improved fishing lure which allows for quick and efficient changing of the posterior portion of the lure.

It is a feature of the present system of lure lead connection adapter to incorporate a wire form with open end clasp and having a spring closure to add easy changeover and articulatability to a number of otherwise conventional lure constructions.

Briefly described according to one embodiment of the present invention, a fishing lure release apparatus is a quick release system that allows rapid interchanging of fishing lures on a fishing line. A fishing lure release apparatus is a quick release system that allows rapid interchanging of fishing lures on a fishing. An anterior lead head opposite a posterior open end clasp are opposed along a linearly elongated wire form. The posterior open end clasp forms an attachable hook element that is impinged by a spring urged closure. The hook element is inserted into a inner tubular cavity of the closure causing an impingement of the hook opening for securely holding and maintaining a mechanical coupling to anything attached thereto, while at the same time providing easy removal by sliding the closure upward along the body of the wire form. Should the user desire to change lures, it can be accomplished in seconds, without removal from the line.

An advantage of the present invention is that it can be used in conjunction with tube baits, solid baits, spinners and spoons lures.

Further, the apparatus allows for instant hook size changes, and allows for changes in the plastic bait body without the cutting of the line. It allows fishermen to go from a floating bait to an underwater swim bait without changing baits, and can be made in coded sizes to indicate bait size range for wire size and can be used to match weights and floats.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 4b is a front elevational view thereof showing a comparison of a tube bait used with the PRIOR ART as compared to that of FIG. 4a;

FIG. 5a is a front elevational view of a fishing lure release apparatus 10 according to the preferred embodiment of the present invention shown used in conjunction with an otherwise conventional in-line spinner 60; and FIG. 5b is a front elevational view of the configuration of FIG. 5a shown used in conjunction with an otherwise conventional tube bait 50.

DESCRIPTION OF THE PREFERRED EMBODIMENTS

In order to understand the prior art into which the current invention fits, it is known that there are many types of fishing lures, each designed to move in different ways so as to resemble prey. These different lures are made in a variety of forms to give an appears that range from the look of a dying or injured fish, to a fast moving fish. The present invention can be best described as shown in conjunction with various combinations with in the Figures.

1. Detailed Description of the Figures

Figure 1:
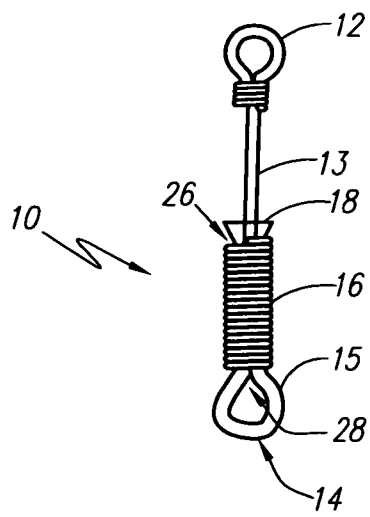
FIG. 1 is a front elevational view of a fishing lure release apparatus 10 according to the preferred embodiment of the present invention.

Referring now to FIG. 1, a fishing lure release apparatus 10 is shown in accordance with the preferred embodiment of the present invention. The fishing lure release apparatus 10 comprises an closed wire loop eyelet 12 opposite a posterior open end clasp 14 along a linearly elongated wire form 13. The posterior open end clasp 14 forms an attachable hook element 15 that is impinged by a spring urged closure 16. An elastomeric stop 18 retains the proximal end of the spring urged close 16, and the hook element 15 is inserted into a inner tubular cavity 26 of the closure 16 cause an impingement of the hook opening 28 for securely holding and maintaining a mechanical coupling to anything attached thereto, while at the same time providing easy removal by sliding the closure 16 upward along the body of the wire form 13.

Figure 2:
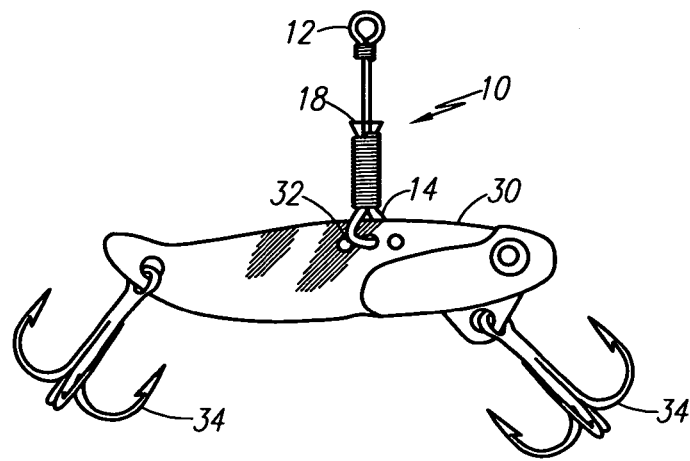
FIG. 2 is a front elevational view showing the apparatus 10 used in conjunction with a blade-type bait 30.

As shown in conjunction with FIG. 2, the fishing lure release apparatus 10 is shown in direct attachment to a blade lure 30 at the clap 14. In such a configuration, the closed wire loop eyelet 12 is affixed to a fishing line 20 in an otherwise generally conventional manner. However, the posterior open end clasp 14 can be attached directly to the blade lure 30 at a lure attachment orifice 32 that are generally available therewith. In such a configuration, the lure 30 is held centrally and in a generally horizontal configuration. As such, the hooks 34 are posited radially away from the line 20, and therefore eliminates line fouling by the hooks 34 while vertically jigging.

Such a configuration is generally possible with blade baits, jigging spoons and the like, and allows the user to vertically jig with the line free of hook fouling, while at the same time allowing for rapid removal, reattachment, or changes of lure configuration.

Figure 3:
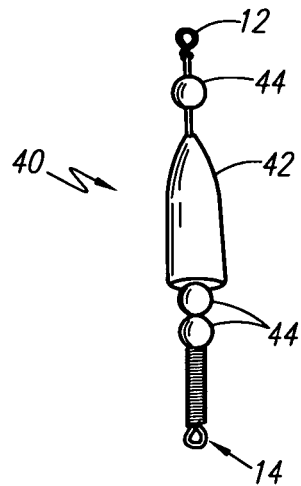
FIG. 3 is a front elevational view of a fishing lure release apparatus according to a first alternate embodiment 40 shown in a weighted configuration.

Referring now to FIG. 3, the fishing lure release apparatus is shown adapted to a weighted configuration 40. In such a configuration, the closed wire loop eyelet 12 and posterior clasp 14 are still provided, but with a weight added to the linearly elongated wire form 13. Shown herein, a bullet type weight 42 is provided. Additionally, beads 44 can also be utilized to allow the fisherman to add color and sound by using various configurations.

Figure 4A:
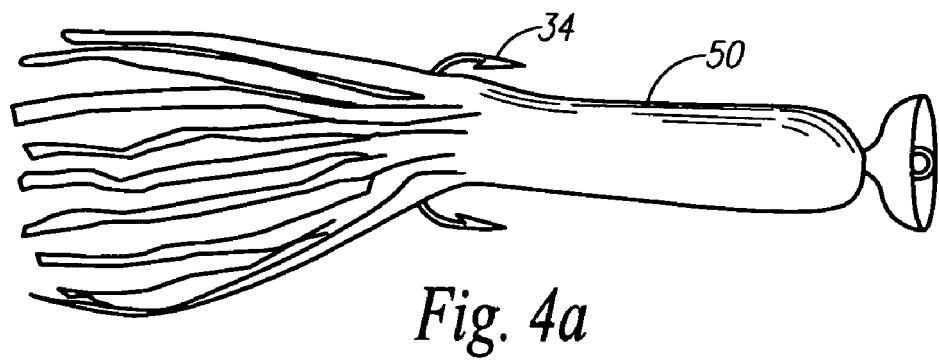
FIG. 4a is a front elevational view thereof shown used in conjunction with an otherwise conventional tube bait 50.
Figure 4B:
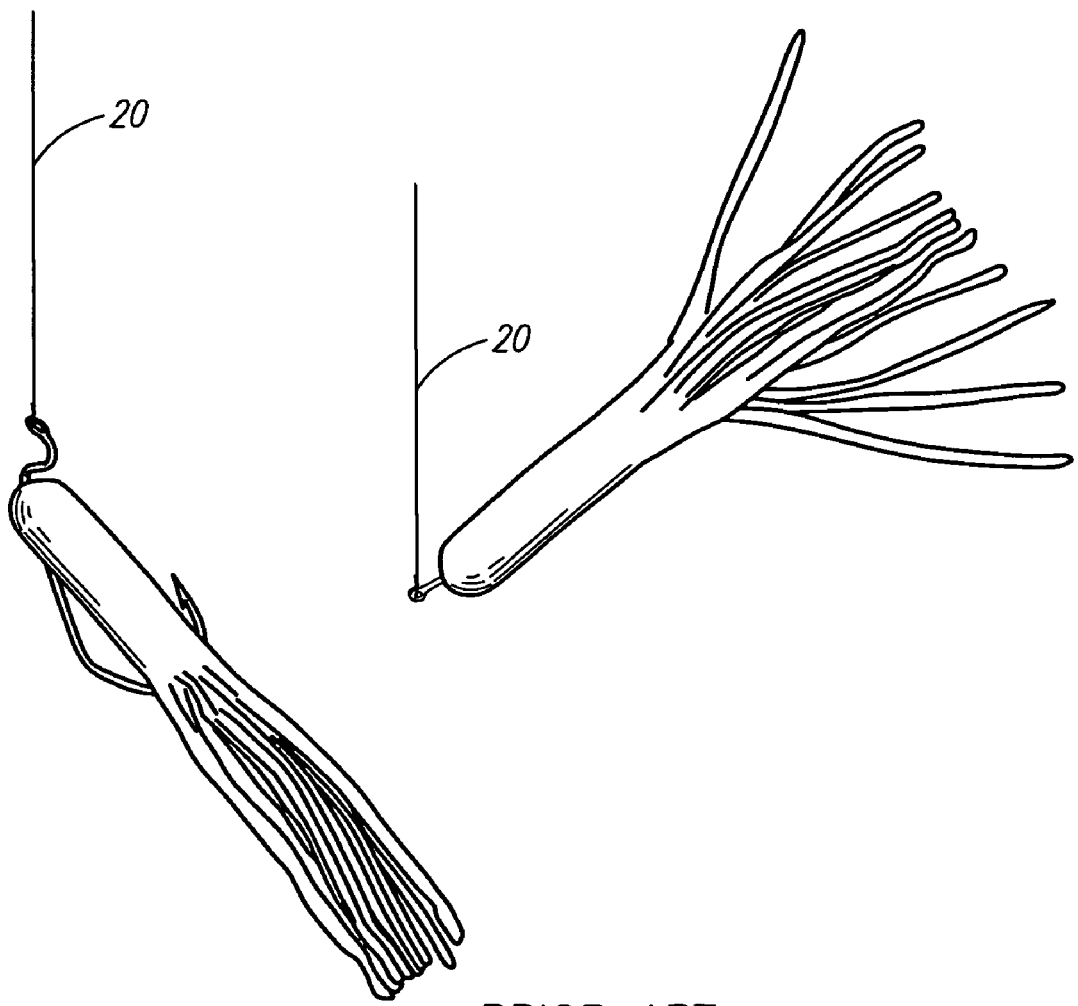

Useful in trolling, such an inline trolling weight configuration can be used in various combinations with the posterior clasp 14 allowing for quick changing of lures or configurations. By way of example, and not as a limitation, as shown in conjunction with FIG. 4a such a weighed configuration can also be introduced into an otherwise conventional unweighted tube bait 50. In addition to such adaptability, such a configuration introduces other unanticipated benefits. For example, in such a configuration the unweighted tube bait 50 sites at rest in a more horizontal manner than standard worm-hooked baits. Further, when used with a treble hook 34, a bait skirt 52 is flared, further presenting a more natural configuration that is not otherwise achieved (See FIG. 4b).

Referring now to FIGS. 5a and 5b, the fishing lure release apparatus 10 is shown in accordance with in-line spinners. In-line spinners utilize a metal blade 60 that revolve around a central axis which may be attached by a clevis 62. Most in-line spinners have weights 64 rigged behind the spinning blade 60 and beads 66 or other hardware that separates the clevis 62 from the weights 64 for reduced friction during spinning. Due to the fact that the spinning blade 60 causes the whole bait to rotate, swivels 68 prevent the twisting of the line 20.

Conventional in-line spinners must use either a dressed treble, or a plastic body type bait with a straight or wide gap single hook. The addition of the lure release apparatus 10 in such a configuration allows the user to feed the wire through a tube bait body 50. A treble hook 34 can then be used in conjunction with such a configuration. Additionally, if a solid body bait is used, the bait requires a chamber through the bait body to allow the wire to pass through. The anterior and posterior hook ends 12, 14 are generally configured to be smaller in diameter than the hook eye, thereby allowing a snug fit when the hook is attached and the wire drawn back into the body. When a multiple hook configuration is used, when the wire is drawn back into the bait, the double hook will rest on the sides of the bait.

2. Operation of the Preferred Embodiment

In operation, the fishing lure release apparatus 10 can be used in conjunction with tube baits, solid baits, spinners and spoons lures. The apparatus 10 allows for instant hook size changes, and allows for changes in the plastic bait body without the cutting of the line. It allows fishermen to go from a floating bait to an underwater swim bait without changing baits, and can be made in coded sizes to indicate bait size range for wire size and can be used to match weights and floats. It can also be used to accommodate a "teaser" lure which is used 2 to 4 feed ahead of crankbaits, spinner rigs, plastic body lures or any fishing lure that would benefit from a bait chasing a meal presentation. It can be used with or without a hood attached. By way of example, and not as a limitation, a lure representing an emergent insect can be used. In such an embodiment, to reduce the size of the teaser, a bead or similar small profile part can be used to replace the spring for small lures.

As designed, a device embodying the teachings of the present invention is easily applied. The foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. Therefore, the scope of the invention is to be broadly limited only by the following claims.

What is claimed is:
1. A fishing lure release apparatus comprising:
a linearly elongated wire form having an closed wire loop eyelet;
a posterior open end clasp opposite said closed wire loop eyelet, said posterior open end clasp forming an attachable hook element;

a spring forming an inner tubular cavity and circumscribing said wire form; wherein the hook element is inserted into the inner tubular cavity of the spring causing an impingement of the hook opening, and an elastomeric stop retaining the proximal end of the spring for securely holding and maintaining a mechanical coupling to anything attached thereto, while at the same time providing easy removal by sliding the closure upward along the body of the wire form.

2. The fishing lure release apparatus of claim 1, adapted such that when in direct attachment to a spoon lure at said clasp and said closed wire loop eyelet is affixed to a fishing line, the lure is held centrally and in a generally horizontal configuration.

3. The fishing lure release apparatus of claim 1, further comprising a weight added to said linearly elongated wire form.

4. The fishing lure release apparatus of claim 3, wherein said weight is a bullet type weight of selected size to allow a fisherman to present his bait at various depths by using configurations with different weights.

5. The fishing lure release apparatus of claim 3, further comprising a tube bait circumscribing said wire form;
wherein in such a configuration said tube bait sits at rest in a more horizontal manner than standard worm-hooked baits.

6. The fishing lure release apparatus of claim 5, further comprising a treble hook.

7. The fishing lure release apparatus of claim 1, further comprising an in-line spinner affixed to said closed wire loop eyelet.

8. The fishing lure release apparatus of claim 7, further comprising a tube bait circumscribing said wire form.

* * * * *

UNITED STATES PATENT AND TRADEMARK OFFICE
CERTIFICATE OF CORRECTION

| | | |
|---|---|---|
| PATENT NO. | : 8,020,339 B1 | Page 1 of 1 |
| APPLICATION NO. | : 12/173996 | |
| DATED | : September 20, 2011 | |
| INVENTOR(S) | : Russell R. Carter | |

It is certified that error appears in the above-identified patent and that said Letters Patent is hereby corrected as shown below:

Title Page, item (57);
In the abstract, line 2, at the end of the first sentence, please add the word --lines-- at the end of the sentence.

In Column 2, lines 27 through 29, please delete the sentence "A fishing lure release apparatus is a quick release system that allows rapid interchanging of fishing lures on a fishing."

In column 3, line 19, please delete the word "appears" and replace with --appearance--.

In column 3, line 40, please delete the word "clap" and replace with --clasp--.

In column 4, line 5, please delete the word "sites" and replace with --sits--.

In column 4, line 43, please delete the word "feed" and replace with --feet--.

In column 4, line 46, please delete the word "hood" and replace with --hook--.

Signed and Sealed this
Third Day of January, 2012

David J. Kappos
*Director of the United States Patent and Trademark Office*